United States Patent [19]

Hill

[11] Patent Number: 5,390,422
[45] Date of Patent: Feb. 21, 1995

[54] APPARATUS FOR ALIGNING HANDLE VALVES

[75] Inventor: Loran R. Hill, Indianapolis, Ind.

[73] Assignee: Masco Corporation of Indiana, Indianapolis, Ind.

[21] Appl. No.: 76,301

[22] Filed: Jun. 11, 1993

[51] Int. Cl.[6] .............................................. G01B 5/25
[52] U.S. Cl. ........................... 33/412; 33/809; 33/645; 33/654; 33/562
[58] Field of Search ................ 33/412, 464, 483, 809, 33/520, 529, 613, 645, 654, 562, 523; 7/163, 164; 269/904; 81/13, 55; 411/87, 91, 92

[56] References Cited

U.S. PATENT DOCUMENTS

| | | | |
|---|---|---|---|
| 1,110,335 | 9/1914 | Morewood | 411/91 |
| 1,545,424 | 7/1925 | Heimrich | 33/562 |
| 1,598,248 | 8/1926 | Paine | 33/412 |
| 1,981,751 | 11/1934 | Passler | 411/90 |
| 2,522,283 | 9/1950 | Lamkin | 33/412 |
| 2,548,197 | 4/1951 | Conner | 33/562 |
| 2,949,748 | 8/1960 | Berta, Jr. | 33/563 |
| 3,097,843 | 7/1963 | Morrow . | |
| 3,159,394 | 2/1962 | Burns . | |
| 3,245,643 | 4/1966 | Burns . | |
| 3,698,060 | 10/1972 | Helton . | |
| 4,671,483 | 6/1987 | Harbeke . | |
| 4,770,399 | 9/1988 | Sossen et al. . | |
| 4,958,814 | 9/1990 | Johnson . | |

FOREIGN PATENT DOCUMENTS

| | | | |
|---|---|---|---|
| 0512930 | 7/1956 | Italy | 33/809 |
| 0575360 | 2/1946 | United Kingdom | 33/645 |
| 1460593 | 2/1989 | U.S.S.R. | 33/412 |

*Primary Examiner*—Thomas B. Will
*Attorney, Agent, or Firm*—Myron B. Kapustij; Malcolm L. Sutherland

[57] ABSTRACT

A valve stem aligning and holding apparatus for facilitating the installation of valve assemblies in a faucet having wide spread valves. The apparatus is longitudinally adjustable among a wide variety of positions. The apparatus comprises a stationary member including guide raised side sections, and a movable member adapted to coact with the guide side sections and be slidably mounted in the stationary member. The stationary member has a plurality of openings at predetermined intervals while the movable member has at least one opening adjacent one end, preferably the front end, thereof. The openings are adapted to receive and hold valve stems of valve assemblies.

18 Claims, 4 Drawing Sheets

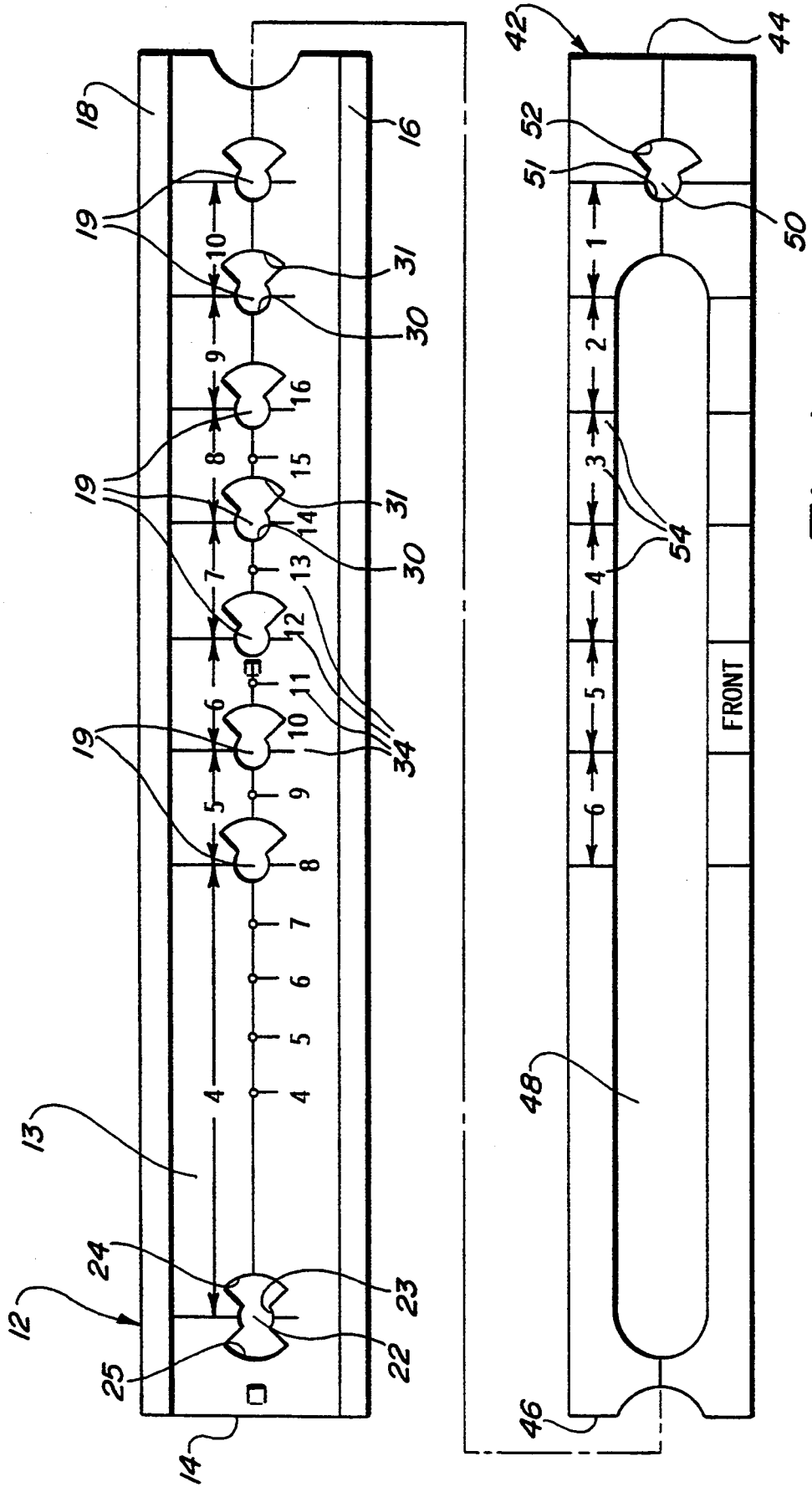

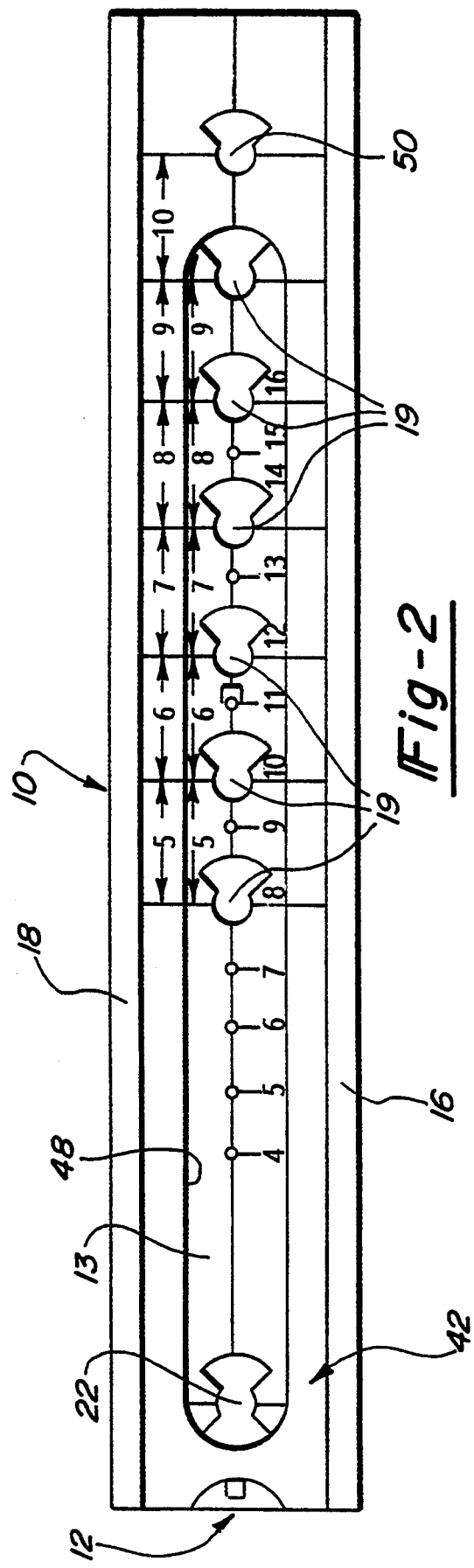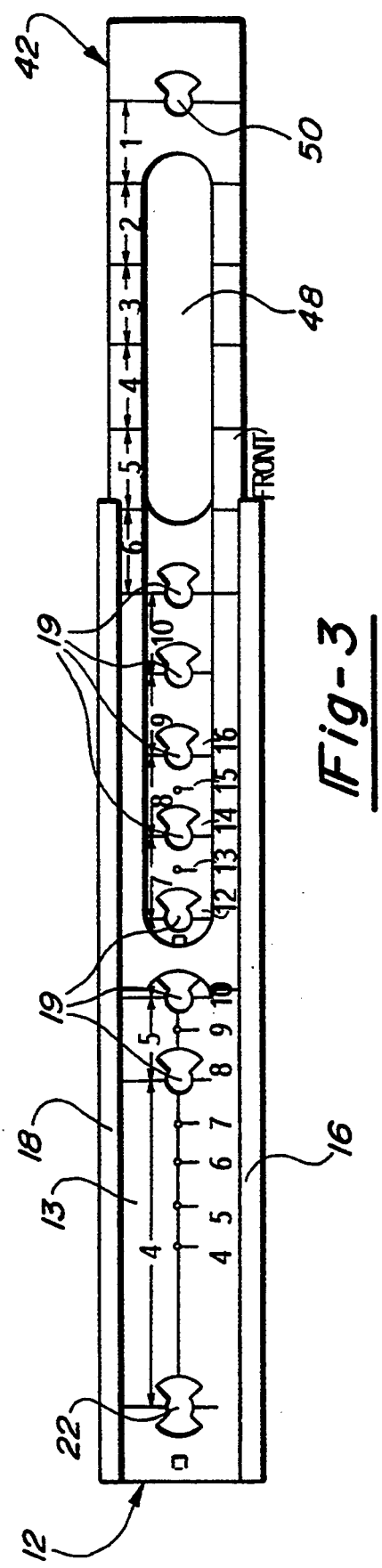

APPARATUS FOR ALIGNING HANDLE VALVES

FIELD OF THE INVENTION

This invention relates to aligning and holding apparatus and more particularly to-adjustable aligning and holding apparatus especially suitable for plumbing applications, particularly for installation of faucets having spaced apart handle valves.

BACKGROUND OF THE INVENTION

In installing faucets with two wide spread handles a problem is encountered in holding the two valves in a properly aligned position while tightening them from under the sink. If the valves, particularly the handle stops, are misaligned the handles will not be properly aligned with each other. Furthermore, it is often difficult to provide two openings in the sink or countertop, which openings accept the valve assemblies, spaced apart by an exact predetermined distance, e.g., eight inches. Instead, for example, the openings may be spaced apart eight and one-half or seven and three quarter inches. There thus exists a need for a device which holds the two valves in predetermined positions while they are being secured to the sink in order to insure proper relative positioning and alignment with a minimum of time and effort and which device is further continuously variable or adjustable to adjust for different spacings of the two valve assemblies. The instant invention provides such a device which is relatively simple and easy to use and which is readily and quickly adjustable among a wide variety of positions.

SUMMARY OF THE INVENTION

The instant invention is directed to an adjustable aligning and holding apparatus for securing against rotational movement handle stops of valve assemblies of faucets which have spaced apart handle valves during the installation of such faucets. The apparatus is of a slide-rule type construction and comprises an elongated stationary member and a relatively thin, flat movable member adapted to be slidably mounted in said stationary member. The stationary member has a plurality of longitudinally spaced apart openings and the slidable member has at least one opening, the openings adapted to fit over valve stems and handle stops to keep the handle stops from rotating and becoming misaligned during installation. The apparatus is adjustable for use with handle valve assemblies spaced apart different distances. Adjustment is accomplished by extending or retracting the movable member from the stationary member. By using the apparatus of the instant invention the valves are held against movement during assembly to the sink so that the handles, once installed, will be properly oriented relative to each other and the spout.

BRIEF DESCRIPTION OF THE DRAWINGS

FIG. 1 is a top plan view of the aligning and holding apparatus in a disassembled state with the movable member removed from the stationary member;

FIG. 2 is a top plan view of the aligning and holding apparatus of FIG. 1 in an assembled state with the movable member mounted in the stationary member with the movable member in a fully retracted position;

FIG. 3 is a view similar to FIG. 2 except with the movable member in a fully extended position;

DESCRIPTION OF THE PREFERRED EMBODIMENT

Figure 4:
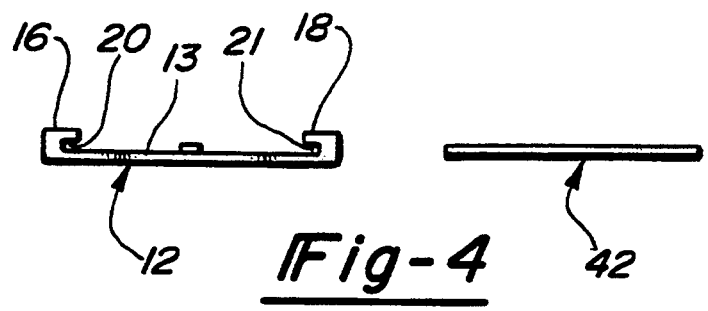
FIG. 4 is an end view in elevation of FIG. 1.
Figure 5:
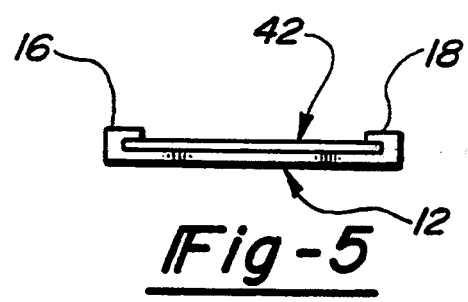
FIG. 5 is an end view in elevation of FIG. 2.

The adjustable aligning and holding apparatus 10 of the instant invention comprises a stationary member 12 and a movable member 42 adapted to be slidably mounted in stationary member 12. Stationary member 12 is comprised of two longitudinally extending raised side sections 16 and 18 and a central section 13 intermediate side sections 16 and 18. Movable member 42 is an elongate relatively flat, thin and relatively rigid plate having a front leading edge 44 and a rear edge 46. Member 42 is adapted to be slidably mounted between raised side sections 16 and 18 of stationary member 12. More particularly, member 42 is slidably mounted in longitudinally extending horizontal slots 20 and 21 in side sections 16 and 18, respectively.

Movable member 42 has an ovoid, elongate opening 48 extending longitudinally therethrough. Member 42 also has opening 50 intermediate the leading edge 44 and opening 48. Opening 50 is comprised of a generally circular central section 51 and a fan shaped radially extending side section 52. Circular central section 51 is adapted to fit over a valve stem while fan shaped section 52 is adapted to fit over the handle stop 112 of valves 100. Movable member 42 also has a set of indicia 54 thereon. In the embodiment illustrated in the drawings the indicia are lines scribed at one inch intervals.

The stationary member 12 has at least one but generally a plurality of openings 19, 22 cut at predetermined intervals in central section 13. The openings 19 are comprised of a central generally circular shaped section 30 and a radially extending fan shaped side section 31. The central circular shaped section 30 is sized to fit over the valve stem 110 of a valve 100 while the fan shaped section 31 is sized to fit over the handle stop 112. An opening 22 is provided in the central section 13 adjacent the rear edge 14 of the stationary member 12. Opening 22 is comprised of a central circular shaped section 23 and two radially extending fan shaped side sections 24 and 25. Fan shaped side sections 24 and 25 are spaced apart 180°. The central circular section is adapted to fit over a valve stem while fan shaped side sections 24 and 25 are adapted to fit over the handle stop 112. Opening 22 has two fan shaped side sections 24 and 25 so that it can be utilized with valve assemblies having handle stops 112 either to the right or to the left of valve stem 110. Stationary member 12 also has a set of indicia 34 thereon.

As best illustrated in FIGS. 2 and 3 the elongate opening 48 in movable member 42 is sized so as to be of a width wherein the openings 19 and the indicia 34 of the stationary member 12 are visible and exposed when the movable member 42 is in a retracted or partially retracted position in stationary member 12.

In the preferred embodiment illustrated the apparatus is made from metal, preferably aluminum or a light weight alloy of aluminum but may also be made from a plastic or resin material having good dimensional stability and rigidity.

Figure 6:
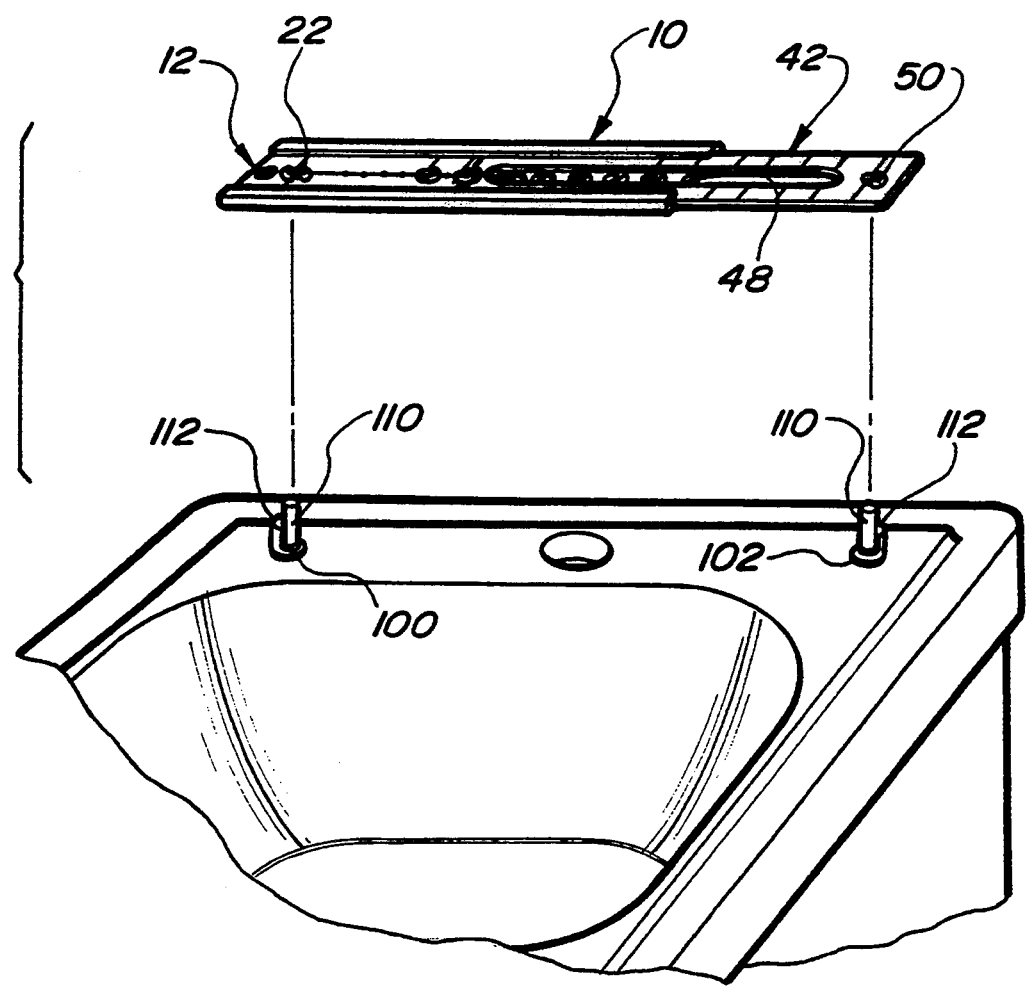
FIG. 6 is an exploded perspective view of the apparatus of the invention and two faucet handle valves.
Figure 7:
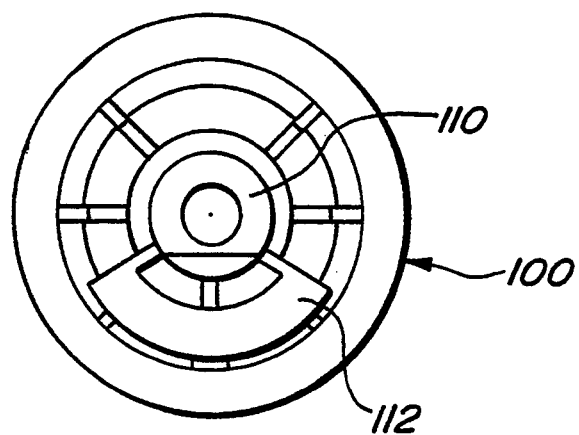
FIG. 7 is a top plan view of a faucet handle valve illustrating the valve stem and handle stop.

In operation, as illustrated in FIG. 6, the aligning and holding apparatus 10 is placed over the valve stems 110 and handle stops 112 of valves 100. More specifically, as illustrated in FIG. 6, the central circular section 23 of opening 22 is placed over and receives valve stem 110 and the fan shaped section 25 is placed over and receives handle stop 112 of the left valve assembly 100 of a pair of handle valves while circular central section 51 of opening 50 is placed over valve stem 110 and fan shaped section 52 is placed over handle stop 112 of the right valve assembly 102.

In FIG. 6 the two valve assemblies 100 and 102 are about 16 inches apart, thus the movable member 42 is in a fully extended position relative to the stationary member 12, and openings 22 and 50 are utilized. If the valve assemblies are spaced a lesser distance apart the movable member 42 can be retracted into the stationary member (moved to the left in FIG. 3) to adjust for the difference in distance between the two valve assemblies. That is to say, if the valve assemblies are farther apart movable member 42 can be extended, while if the valve assemblies are spaced a lesser distance apart the movable member 42 can be retracted. In the embodiment illustrated if the valve assemblies are ten or less inches apart then only the openings 19 and 22 in the stationary member 22 are utilized.

With the valve stems and handle stops of the two valve assemblies disposed in the appropriate openings in the apparatus, e.g., 22 and 50, the two valve assemblies can be secured to the sink and/or to the pipes underneath the sink. Once the valve assemblies are securely mounted the apparatus is lifted off the valve stems and handle stops. Appropriate handles are then mounted on the valve stems.

In view of the foregoing, it is readily apparent that the apparatus of the present invention provides a device for dependably holding the handle stops of valve assemblies against rotation while the valve assemblies are attached to the sink and corresponding pipes. The apparatus enables such attachment operation to be accomplished by a single person readily and easily with the apparatus being thereafter easily removable from the valve stems. Furthermore, the apparatus being fully adjustable can be used for valve assemblies which are spaced apart different distances.

Although the invention has been herein shown and described in what is conceived to be the most practical and preferred embodiment, it is recognized that departures may be made therefrom within the scope of the invention, which is not to be limited to the illustrative details disclosed.

What is claimed is:

1. An aligning and holding device for valve stems of faucet valve assemblies comprising:
   a stationary member including two longitudinally extending laterally spaced apart raised side sections and a central section intermediate said side sections, and at least one opening in said central section including a central circular shaped portion adapted to receive a valve stem and at least one radially extending fan shaped portion adapted to receive a handle stop; and
   a movable member adapted to coact with said raised side sections to move longitudinally relative to said stationary member, said movable member including at least a first opening adapted to receive at least a handle stop.

2. The device of claim 1 wherein each of said side sections has a longitudinally extending horizontal slot adapted to slidably receive said movable member.

3. The device of claim 1 wherein said at least one opening in said central section includes a central circular shaped portion and two radially extending fan shaped side portions.

4. The device of claim 3 wherein said two side portions are spaced apart 180°.

5. The device of claim 1 wherein said stationary member includes measurement indicia thereon.

6. The device of claim 5 wherein said indicia are on said central section.

7. The device of claim 1 wherein said movable member comprises an elongate, flat and thin plate.

8. The device of claim 7 wherein said movable member includes a second elongate longitudinally extending opening sized to expose at least one of said openings in said stationary member.

9. An aligning and holding device for valve stems of faucet valve assemblies comprising:
   a stationary member including guide means,
   at least one opening in said stationary member adapted to receive at least a handle stem; and
   a movable member comprising an elongate, flat plate adapted to coact with said guide means for slidable movement relative to said stationary member, said movable member including at least one first opening having a central circular shaped portion adapted to receive a handle stem and at least one radially extending fan shaped side portion adapted to receive a handle stop, and a second elongate longitudinally extending opening sized to expose at least one of said openings in said stationary member.

10. The device of claim 9 wherein said guide means comprise two longitudinally extending laterally spaced apart raised side sections and a central section intermediate said side sections.

11. The device of claim 10 wherein said at least one opening is disposed in said central section and is comprised of a central circular shaped portion and at least one radially extending fan shaped side portion.

12. The device of claim 11 wherein each of said side sections has a longitudinally extending horizontal slot adapted to slidably receive said movable member.

13. An aligning and holding device for valve stems of faucet valve assemblies comprising:
   a stationary member including a central section containing a plurality of openings wherein at least one of said plurality of openings in said central section includes a central circular shaped portion adapted to receive a valve stem and at least one radially extending fan shaped side portion adapted to receive a handle stop; and
   a movable member longitudinally movable with respect to said stationary member, said movable member including at least one first opening having a central circular shaped portion adapted to receive a valve stem and at least one radially extending fan shaped side portion adapted to receive a handle stop.

14. The device of claim 13 wherein at least one of said plurality of openings in said central section includes a central circular shaped portion and two radially extending fan shaped side portions.

15. The device of claim 14 wherein said two side portions are spaced apart 180°.

16. The device of claim 13 wherein said stationary member includes distance measuring indicia thereon.

17. The device of claim 16 wherein said indicia are on said central section.

18. The device of claim 13 wherein said movable member includes a second elongate longitudinally extending opening sized to expose at least one of said openings in said stationary member.

* * * * *